United States Patent [19]

Maurer

[11] Patent Number: 5,161,244
[45] Date of Patent: Nov. 3, 1992

[54] CRYPTOGRAPHIC SYSTEM BASED ON INFORMATION DIFFERENCE

[75] Inventor: Ueli Maurer, Wil, Switzerland
[73] Assignee: Omnisec AG, Regensdorf, Switzerland
[21] Appl. No.: 711,543
[22] Filed: Jun. 6, 1991

[30] Foreign Application Priority Data

Apr. 29, 1991 [EP] European Pat. Off. ......... 91106949.0

[51] Int. Cl.$^5$ .................................................. H04L 9/00
[52] U.S. Cl. ............................................. 380/43; 380/45
[58] Field of Search ........................ 380/43, 45, 30, 50

[56] References Cited

U.S. PATENT DOCUMENTS

| | | | |
|---|---|---|---|
| 4,208,739 | 6/1980 | Lu et al. | 375/2 |
| 5,054,066 | 10/1991 | Riek et al. | 380/30 |

OTHER PUBLICATIONS

IBM Technical Disclosure Bulletin, vol. 28, No. 7, Dec. 1985, New York, US. pp. 3153-3163, 'Quantum Public Key Distribution System'.
Siam Journal of Computing, vol. 17, No. 2, Apr. 1988, New York (US) pp. 21210-21229, Bennett et al. 'Privacy Amplification by Public Discussion'.

*Primary Examiner*—Thomas H. Tarcza
*Assistant Examiner*—David Cain
*Attorney, Agent, or Firm*—EGLI International

[57] ABSTRACT

The cryptographic system is comprised of two stations A and B in which a respective string $S_A$ and $S_B$ of digits is stored. In station A an error-control information string C is generated from string $S_A$ and transmitted to station B over an error-free public channel CH1. In station B a particular string D and a decision bit F are generated. String D maximizes a predetermined reliability function of a string combination ($S_B$, C, D). Decision bit F is assigned the value 1 if and only if a maximum value taken on by the reliability function is greater than a predetermined threshold. Decision bit F is transmitted to station A over an error-free public channel CH2. In both stations A and B, the respective strings $S_A$ and $S_B$ are tagged as accepted when said decision bit F has the value 1. The above sequence is repeated, resulting in a plurality of tagged strings which are concatenated at stations A and B to result in a random cipher key shared by the stations A and B.

The predetermined reliability function can be defined as a conditional probability $P(\hat{S}_A = D | \hat{S}_B = S_B, \hat{C} = C)$ that a random variable $\hat{S}_A$ corresponding to string $S_A$ is equal to string D, given the conditions that a random variable $\hat{S}_B$ corresponding to string $S_B$ is equal to that latter string $S_B$ and a random variable $\hat{C}$ corresponding to the error-control information string C is equal to that latter string C.

24 Claims, 1 Drawing Sheet

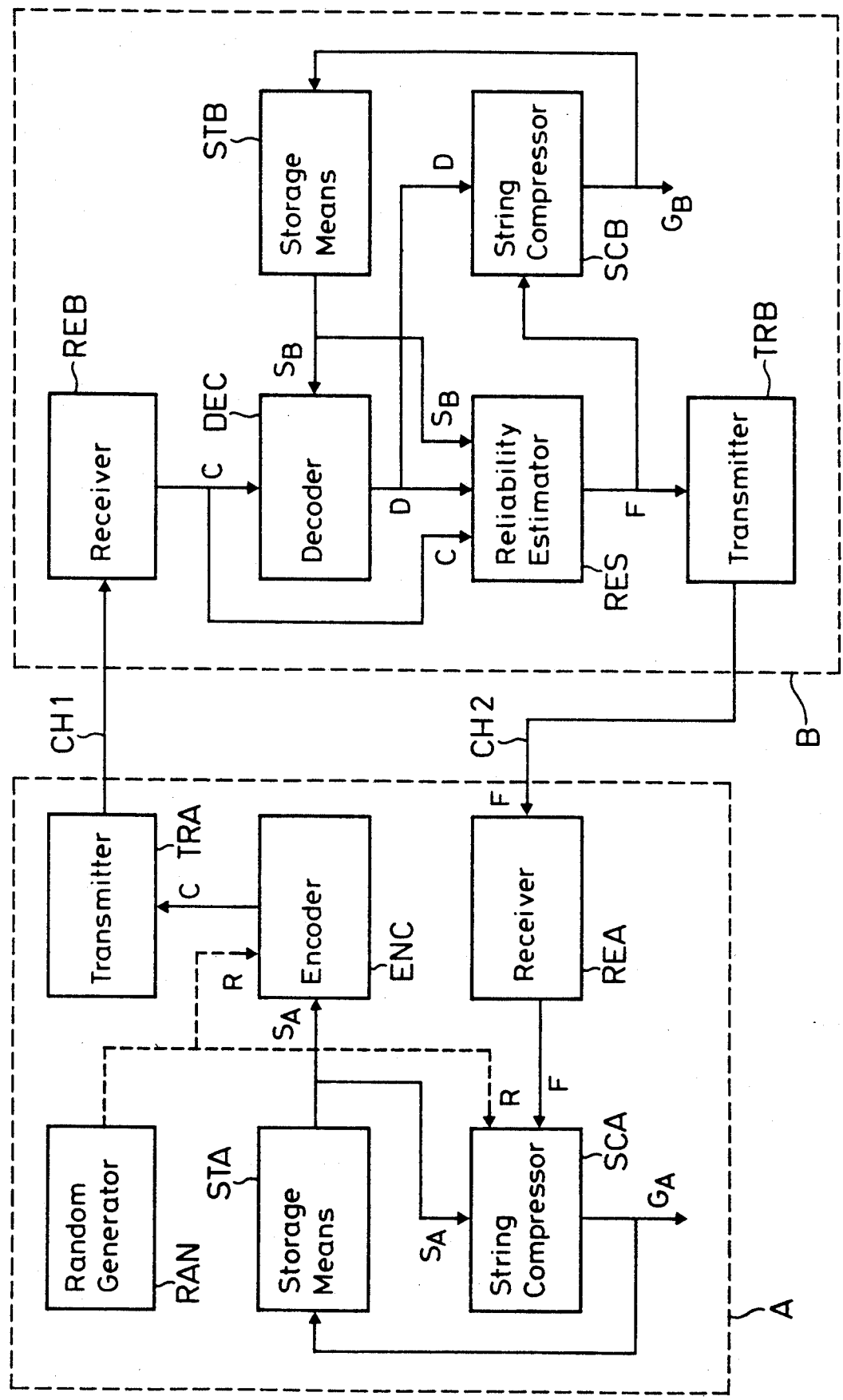

CRYPTOGRAPHIC SYSTEM BASED ON INFORMATION DIFFERENCE

BACKGROUND OF THE INVENTION

The present invention relates to cryptographic systems, and more particularly to a method of generating a cipher key based on information difference in a cryptographic system and to a cryptographic system for performing this method.

Cryptographic systems are widely used to ensure the privacy and authenticity of messages transmitted over insecure communication channels such as public telephone lines. They are heavily relied on in military, diplomatic and business communications of information, including voice, picture and text data, and for identification purposes.

One type of cryptographic system, generally known as a privacy cryptosystem, prevents the extraction of information by unauthorized parties from messages transmitted over an insecure communication channel, thus assuring a transmitter that a message being transmitted is read only by an intended receiver.

A conventional type of privacy cryptosystem allows a transmitter to transmit a plaintext message over, for instance, a telephone line to a receiver. At the transmitter's site, an encryption device encodes with a secret key the plaintext message into a ciphertext message which is then transmitted. At the receiver's site, a decryption device decodes the ciphertext message by means of the same secret key back into the plaintext message. Given the secret key, the transformations on the message can be performed, whereas they cannot be performed without knowledge of the secret key, to the present state of mathematical knowledge, even with the most powerful computers known. Thus, for an eavesdropper who wants to decipher the message and yet is assumed to have no information about the secret key, it is infeasible to determine the plaintext message corresponding to a given ciphertext or to determine the secret key even if he were given matching plaintext/ciphertext pairs.

A problem inherent to this conventional type of privacy cryptosystem is that it requires the distribution of secret keys to the communicating parties. This is often done over a secure channel such as priority mail, or in advance by a trusted courier, which has the drawback of being expensive and may even be impossible, as in many military applications.

While in theory it is possible for an eavesdropper to break this conventional type of privacy cryptosystem, for instance by an exhaustive key search, this is completely infeasible if the key is sufficiently long (e.g., a string of 100 random bits). However, none of the presently used privacy cryptosystems is such that the computational security can be proved, i.e. no rigorous proof can be given in any of these cryptosystems that there exists no essentially faster way of breaking the cipher than by an exhaustive key search in which the cryptanalyst tries all possible keys to decipher the given ciphertext until the resulting decrypted ciphertext is one that makes sense, for instance by representing plain English text. When the amount of ciphertext is reasonably large, only one key will produce a valid plaintext message, which then also is the correct plaintext message.

In 1949, Shannon proved that ciphers can be built which are impossible to break, even for an eavesdropper with unrestricted computing power (cf. C. E. Shannon, "Communication theory of secrecy systems", Bell Syst. Tech. J., vol. 28, Oct. 1949, pp. 656–715). Such ciphers are called unconditionally secure. There is a simple explanation of how such unconditional security can be achieved: even if the eavesdropper uses all possible keys to decipher the message, all the resulting plaintexts are valid plaintexts and thus it is impossible for the eavesdropper to choose the correct one among them.

A well-known example of unconditionally secure cipher is the so-called one-time pad originally proposed by Vernam (G. S. Vernam, "Cipher printing telegraph systems for secret wire and radio telegraphic communications", J. Amer. Inst. Elec. Eng., vol. 55, 1926, pp. 109–115). In this kind of cipher, a completely random string of the same length as the plaintext is used as the secret key, and the ciphertext is obtained by adding bit by bit modulo 2 the bit sequences of the plaintext and key strings, addition modulo 2 being defined by the rules $0+0=0$; $0+1=1$; $1+0=1$; $1+1=0$. The one-time pad achieves perfect security in the sense that the eavesdropper's optimal strategy for determining the plaintext is provably independent of the ciphertext, in other words, the ciphertext is statistically independent of the plaintext.

A drawback of unconditionally secure ciphers is that the secret key used to encipher a plaintext must be at least as long as the total amount of said plaintext, as has been proved by Shannon. This secret key must be distributed in advance by some secure means, and in most applications it is completely impractical to use such long secret keys.

Shannon's analysis of unconditionally secure ciphers and the proof concerning the minimum amount of secret key required to achieve the described type of unconditional security is based on the assumption that error-free communication channels are used, i.e. that the legitimate receiver as well as the eavesdropper receive an exact copy of the ciphertext message transmitted by the transmitter. However, transmissions over communication channels used in real telecommunications are subject to distortion by noise, i.e., the received signal is not identical to the transmitted signal. By providing sufficient redundancy in the transmitted signal, for instance by transmitting each signal several times or by using error-correcting codes, a channel can be made virtually error-free. More precisely, transmitted messages can be taken from a finite set of possible messages and then, with an arbitrarily small probability of making a wrong decision, the receiver can decide which message was transmitted. Examples of such channels are computer network links. For every channel, the amount of information which can reliably be transmitted in a given time interval is characterized by the capacity of the channel and is finite (see R. G. Gallager, "Information theory and reliable communications", New York: John Wiley, 1968, for a definition of channel capacity). It should be noted that although many communication channels, for instance computer data links, appear to their users to be virtually error-free, the underlying unprotected channel is not error-free.

By way of example, let a channel be considered whose input and output both are binary, i.e. either 0 or 1. Let the error probability of the channel be 10%, i.e. there is a probability of 10% that a transmitted 0 is flipped into a 1 at the receiver, and similarly, there is a probability of 10% that a transmitted 1 is flipped into a 0. A very simple method of increasing the reliability of communications over such a channel is to transmit every bit several times, for instance 7 times. In this instance, after receiving 7 bits, which need not be identical because errors may have occurred on the channel, the receiver will make a majority decision, i.e. the receiver decides that the bit actually transmitted is the bit that is contained 4 or more times in the set of 7 received bits. It can be shown that the bit-error probability is reduced from 10% to 0.43% by means of this very simple error-correcting code.

An error-correcting (n,k) block code is a transformation which assigns to every information word of length k a code word of length n, wherein the information word and code word digits are taken from some finite alphabets. Most often the two alphabets are identical and $n > k$. When the alphabet is the set $\{0,1\}$ the code is called a binary code. A very important class of error-correcting codes is comprised of so-called linear codes in which every code word digit is a linear combination of the information word digits. Addition of binary digits is performed modulo 2 as defined above. Thus, the sum of several bits is equal to 1 if and only if the number of ones among the summed terms is odd, else the sum is equal to 0. A particular and important class of linear codes is comprised of so-called systematic codes for which the code word is the information word together with an appended sequence of n-k parity check bits. By way of example, a linear systematic (7,3) code is one which encodes an information word $[x_1, x_2, x_3]$ into the code word $[x_1, x_2, x_3, x_1+x_2, x_1+x_3, x_2+x_3, x_1+x_2+x_3]$, i.e., the parity check bits consist of all combinations of 2 or 3 information word bits. For instance, when the code is binary the code word assigned to the information word 101 is 1011010.

As mentioned above, the information and code word digits can be taken from any finite set of digits, e.g. the set $\{0,1,2,3,4,5,6\}$, although the most often used codes are binary. In the general case, the addition operation for adding two elements of the taken set must be defined. Usually, this is the addition operation of a finite mathematical group corresponding to the taken set, and then, a linear combination of digits can be defined as the sum of elements of a subset of the taken set, where every subset corresponds to a different linear combination. It is generally accepted and should be noted that, in this context, the taken set itself also is one of said subsets, i.e. the linear combination of digits may be the sum of some or all elements of the taken set. In the above example of the set $\{0,1,2,3,4,5,6\}$ the addition operation can be defined as addition modulo 7, so that for instance $1+4=5$; $3+6=2$; $5+3+4+6=4$; etc., and a linear combination of digits is an addition modulo 7 thereof.

Many communication channels, in particular satellite and radio communication channels, have the property that not only a legitimate receiver but also any other receiver within a certain range can receive the transmitted signal. However, the noise which corrupts the received signals is different for every receiver. The thermal noise within a receiver is statistically independent of that of the other receivers, and the noise introduced by the actual transmission (e.g. the atmospheric noise) is, to a certain degree, also independent for different receivers. The received signal power and- thus the quality of the received signal depends on the location of the receiver with respect to the transmitter and decreases with the square of the distance of the receiver to the transmitter.

A communication channel with one transmitter but possibly several receivers each having a different respective noise is called a broadcast channel. When a system is designed to allow error-free communication between the transmitter and a legitimate receiver, then also another receiver can receive the transmitted information reliably, as long as its signal-to-noise power ratio is at least equal to that of the legitimate receiver. On the other hand, when the eavesdropper's noise is stronger he may not be able to make a reliable decision about the transmitted message even when the legitimate receiver can. Thus, when in a cryptographic communication system the eavesdropper's channel is worse than the legitimate receiver's channel, then it is possible to transmit information securely regardless of the eavesdropper's computing power and manpower. This fact was first pointed out by Wyner (see A. D. Wyner, "The wire-tap channel", Bell Syst. Tech. J., vol. 54, Oct. 1975, no. 8, pp. 1355– 1387). The intuitively obvious fact that such secure communication is possible if and only if the eavesdropper's channel is worse was proved by Csiszár and Körner (see I. Csiszár and J. Körner, "Broadcast channels with confidential messages", IEEE Trans. on Info. The., vol. IT-24, no. 3, May 1978, pp. 339-348).

However, in most cryptographic scenarios it is unrealistic and very dangerous to assume that the eavesdropper's channel is worse than the legitimate receiver's channel. For instance, it is dangerous to assume that the eavesdropper's receiving antenna is smaller than the legitimate receiver's antenna. However, it may be reasonable to assume that the ratio of the eavesdropper's antenna to the legitimate receiver's antenna is not greater than some number, e.g. 10 or 100.

SUMMARY OF THE INVENTION

It is an object of the present invention to exploit the availability of noisy channels in order to achieve unconditional cryptographic security.

More particularly, it is an object of the present invention to exploit the availability of noisy channels in order to achieve unconditional cryptographic security in a cryptographic system in which secret communication is possible even when the eavesdropper's channel is better (i.e. less noisy) than the legitimate receiver's channel.

Still more particularly, it is an object of the present invention to exploit the availability of differences occurring between the legitimate receiver's and the eavesdropper's received versions of one and the same transmitted random string, due to noise differences on the respective transmission channels, in order to achieve unconditional cryptographic security in a cryptographic system in which secret communication is possible even when the eavesdropper's channel is better (i.e. less noisy) than the legitimate receiver's channel.

To attain these objects and others which will appear from the description of the invention given hereinafter, the invention provides a method of generating a cipher key based on information difference in a cryptographic system, as defined in claim 1, and a cryptographic system for performing said method, as defined in claim 22. Preferred embodiments of the method and the system according to the invention are defined in the appended claims.

DETAILED DESCRIPTION

The present invention is based on the use of error-free public communication channels over which two parties can transmit information to each other. Since no assumption is made about the privacy of these channels and the eavesdropper is allowed to perfectly intercept all communication on these channels, their use does not restrict the practicality or reduce the security of the system. These channels each may be any conventional communication channel (e.g. a telephone line or a radio channel) which are appropriately error-protected by using error-correcting techniques, but which need not be protected against eavesdropping.

The present invention does not contradict the teaching of Csiszár and Körner because their teaching only holds for a system in which communication takes place in one single direction, which clearly is in contradistinction to the present invention.

It also should be noted that the invention can be applied in any situation in which two parties each have stored a string of digits, which strings are known to be statistically dependent on each other, i.e. to provide information about each other.

One exemplary situation in which the two parties may possess such strings is after a noisy broadcast channel has been used to transmit a random string from one party to the other. Let a party A transmit a random string to a party B in such manner that the string received by party B is a noisy version of the string transmitted by party A. An eavesdropper E receives a different noisy version of the same random string transmitted by party A. The present invention provides a method for A and B to exploit the availability of such two correlated strings (i.e. strings statistically dependent on each other), even if E's string is, compared to B's string, a less noisy version of A's string, and even if also E's string is, compared to A's string, a less noisy version of B's string.

According to the present invention, which contemplates a method of generating a cipher key based on information difference in a cryptographic system comprised of at least a first and a second cryptography station, said method comprises the steps of storing, in said first and second stations (A,B), a respective string $(S_A, S_B)$ of digits selected from a finite alphabet, in said first station (A), generating an error-control information string (C) from the respective string $(S_A)$ stored in said first station (A), transmitting said error-control information string (C) from said first station (A) to said second station (B) over an error-free public channel CH1, in said second station (B), generating a particular string (D) and a decision bit (F) representative of a reliability estimate, said particular string (D) being that string which maximizes a predetermined reliability function of a string combination $(S_B, C, D)$ consisting of said string $(S_B)$ stored in said second station (B), said error-control information string (C) and said particular string (D), and said decision bit (F) being assigned the value 1 if and only if, when said predetermined reliability function is maximized as said above, a maximum value taken on by said predetermined reliability function is greater than a predetermined threshold, said decision bit (F) else being assigned the value 0, transmitting said value of said decision bit (F) from said second station (A) to said first station (A) over an error-free public channel CH2, in said first and second stations (A,B), tagging as accepted said respective strings $(S_A, S_B)$ stored in said first and second stations (A,B) when said decision bit (F) has the value 1, performing the above sequence of steps a predetermined number of times to result in a corresponding plurality of tagged strings, and at said first and second stations (A,B), concatenating said tagged strings $(S_A, S_B)$ to result in a random cipher key shared by said first and second stations (A,B).

According to the present invention, the following embodiments may be preferred.

Said predetermined reliability function may be defined as a conditional probability $P(\hat{S}_A = D | \hat{S}_B = S_B, \hat{C} = C)$ that a random variable $(\hat{S}_A)$ corresponding to said string $(S_A)$ stored in said first station (A) is equal to said particular string (D), given the conditions that a random variable $(\hat{S}_B)$ corresponding to said string $(S_B)$ stored in said second station (B) is equal to that latter string $(S_B)$ and a random variable $(\hat{C})$ corresponding to said error-control information string (C) is equal to that latter string (C).

In said first station (A), a random string (R) may be generated and then a concatenation is performed on said string $(S_A)$ stored in said first station (A) and said random string (R) to result in a concatenated string $(S_A \# R)$ which is substituted for said string $(S_A)$ stored in said first station (A) when said error-control information string (C) is generated, so that said error-control information string (C) is generated from said concatenated string $(S_A \# R)$.

In the latter case, said predetermined reliability function is defined as a conditional probability $P(\hat{S}_A \# \hat{R} = D | \hat{S}_B = S_B, \hat{C} = C)$ that a random variable $(\hat{S}_A \# \hat{R})$ corresponding to said concatenated string $(S_A \# R)$ stored in said first station (A) is equal to said particular string (D), given the conditions that a random variable $(\hat{S}_B)$ corresponding to said string $(S_B)$ stored in said second station (B) is equal to that latter string $(S_B)$ and a random variable $(\hat{C})$ corresponding to said error-control information string (C) is equal to that latter string (C), and said decision bit (F) is assigned the value 1 if and only if said conditional probability $P(\hat{S}_A \# \hat{R} = D | \hat{S}_B = S_B, \hat{C} = C)$ is greater than a predetermined threshold.

In the latter case, said error-control information string (C) may be generated by first encoding said random string (R) to result in an encoded string and then adding digit by digit said encoded string and said string $(S_A)$ stored in said first station (A), and said predetermined reliability function is defined as a conditional probability $P(\hat{R} = D | \hat{S}_B = S_B, \hat{C} = C)$ that a random variable $(\hat{R})$ corresponding to said random string (R) is equal to said particular string (D), given the condition that a random variable $(\hat{S}_B)$ corresponding to said string $(S_B)$ stored in said second station (B) is equal to that latter string $(S_B)$ and a random variable $(\hat{C})$ corresponding to said error-control information string (C) is equal to that latter string (C).

When said decision bit (F) has the value 1, a string compression may be performed in said first station (A) on said string $(S_A)$ stored therein to result in a first compressed string $(G_A)$ which is then stored in said first station (A).

In the latter case, the sequence of steps may be repeated at least once, and in said repeated sequence said predetermined reliability function is defined as a conditional probability $P(\hat{G}_A = D | \hat{S}_B = S_B, \hat{C} = C)$ that a random variable $(\hat{G}_A)$ corresponding to said first compressed string $(G_A)$ is equal to said particular string (D), given the condition that a random variable $(\hat{S}_B)$ corresponding to said string $(S_B)$ stored in said second station (B) is equal to that latter string $(S_B)$ and a random variable (C) corresponding to said error-control information string (C) is equal to that latter string (C). When said decision bit (F) has the value 1, a string compression also may be performed in said second station (B) on said particular string (D) to result in a second compressed string ($G_B$) which is then stored in said second station (B).

In the latter case, identical string compressions may be performed in said first station (A) on said string ($S_A$) stored therein to result in a first compressed string ($G_A$) which is then stored in said first station (A) and in said second station (B) on said particular string (D) to result in a second compressed string ($G_B$) which is then stored in said second station (B).

Again, when said decision bit (F) has the value 1, identical string compressions may be performed in said first station (A) on random string (R) to result in a first compressed string ($G_A$) which is then stored in said first station (A) and in said second station (B) on said particular string (D) to result in a second compressed string ($G_B$) which is then stored in said second station (B).

Compression of a string of digits may be defined as generating a compressed string consisting of digits, each of which is a linear combination of digits of said string subjected to compression.

Said error-control information string (C) may be generated as a string consisting of digits, each of which is a linear combination of digits of said string ($S_A$) stored in said first station (A).

All strings may be binary strings consisting of a set of bits.

A linear combination of digits may be defined as a sum modulo 2 of the bits comprised in a subset of said set of bits.

In the latter case, both said strings ($S_A, S_B$) respectively stored in said first and second stations (A,B) may have a predetermined number N of bits, said error-control information string (C) consists of a number N-1 of parity check bits, and compression of a string is defined as replacing the latter string by a single bit which results from said linear combination being applied to all bits of the latter string.

In the latter case, said decision bit (F) may be assigned the value 1 when said error-control information string (C) received in said second station (B) is equal to an auxiliary error-control information string (C') computed in said second station (B) for said string ($S_B$) stored in said second station (A) in the same manner as said error-control information string (C) is computed in said first station (A) for said string ($S_A$) stored in said first station (A).

The sequence of steps may be performed a predetermined number of times in succession.

In the latter case, each of said strings ($S_A, S_B$) respectively stored in said first and second stations (A,B) may be a result of a previously performed sequence of steps.

In the latter case, each of said strings ($S_A, S_B$) respectively stored in said first and second stations (A,B) may be a result ($G_A, G_B$) of a previously performed sequence of steps including a string compression performed in said first station (A) on said string ($S_A$ or R) stored therein to result in a first compressed string ($G_A$) which is then stored in said first station (A) and in said second station (B) on said particular string (D) to result in a second compressed string ($G_B$) which is then stored in said second station (B).

Said first and second stations (A,B) may exchange their respective roles when the sequence of steps is repeated.

The sequence of steps may be simultaneously performed a predetermined number of times in parallel, resulting in a same predetermined number of resulting error-control information strings (C) and resulting values of said decision bit (F), all said resulting error-control information strings (C) being merged to be transmitted from said first station (A) to said second station (B) in one message, and all said resulting values of said decision bit (F) being merged to be transmitted from said second station (B) to said first station (A) in one message.

The invention also contemplates a cryptographic system for performing the above defined method, comprising a first and a second cryptography station (A,B), each station (A,B) comprising a respective transmitter and a respective receiver capable of mutually transferring information strings over respective error-free public channels, and a storage means for storing respective strings of digits ($S_A, S_B, G_A, G_B$), the first station (A) further comprising a string compressor having inputs respectively connected to an output of the respective storage means and to an output of the respective receiver, and having an output connected to an input of the respective storage means, and an encoder having an input connected to said output of the respective storage means and an output connected to an input of the respective transmitter, and the second station (A) further comprising a decoder having an input connected to an output of the respective receiver and to an output of the respective storage means, a string compressor having an input connected to an output of the decoder and an output connected to an input of the respective storage means, and a reliability estimator having inputs each respectively connected to said outputs of the decoder, the respective receiver and the respective storage means, and having an output connected to a further input of the string compressor and to an input of the respective transmitter.

Preferably, said decoder and said reliability estimator may be merged into a single device.

Also preferably, when, to perform the method of the invention, a random string is used as defined above, the first station (A) further comprises a random generator whose output is connected to a further input of the respective string compressor and to a further input of the encoder.

The method of the invention as defined above is novel. No prior art cryptographic system can achieve this (see e.g. A. D. Wyner, "The wire-tap channel", Bell Syst. Tech. J., vol. 54, no. 8, pp. 1355–1387, Oct. 1975, and C. H. Bennett, G. Brassard and J.-M. Robert, "Privacy amplification by public discussion", SIAM J. Comput., vol. 17, no. 2, April 1988, pp. 210–229).

The significance of the present invention is that it allows to achieve unconditional security under realistic assumptions about the eavesdropper, whereas in prior art methods the security could be proved only under generally unrealistic assumptions about the eavesdropper.

A noisy broadcast channel of the above type may be created by using an optical fiber. Since the received signal power can be monitored and compared to the transmitter's signal power, an eavesdropper extracting more than a certain fraction of the signal power can be detected. Thus an upper bound on the quality of the eavesdropper's channel is known.

Another possible method for providing received strings having the above described properties consists in broadcasting the output of a random generator. For example, the signal transmitted by a satellite is corrupted by noise when received on the earth, and the noise for three different receivers at three different locations is different.

By way of example, a situation is considered in which A can transmit binary digits to B over a noisy channel with a bit error probability of 30%. E is assumed to receive the bits transmitted by A with a bit error probability of only 20%, where the errors are assumed to be independent, i.e. the probability that E receives an error is assumed to be independent of B receiving an error or not. It should be noted that E actually receives the random bits transmitted by A more reliably than B.

In the exemplary situation defined above, A transmits a string of random bits which is grouped both by A and B into blocks of a certain length. For each received block, B transmits back to A, over a communication channel (e.g. a telephone line or a radio channel) which is error-protected but need not be protected against eavesdropping, an amount of error-control information sufficient to allow A to make a reliable decision about B's block. The amount of error-control information is chosen such that it allows to correct 30% errors in a block, but such that not much more than 30% errors can be corrected. On the other hand, E knows B's received string with a bit error probability of 38%, i.e. less reliably than A, although E knows A's string more reliably than B. The reason is that E's and B's received bits agree only when the two channels from A to B and from A to E either both introduce no error (which has a probability of $0.7 \cdot 0.8 = 0.56$) or both introduce an error (which has a probability of $0.3 \cdot 0.2 = 0.06$). The sum of these two probabilities is $0.56 + 0.06 = 0.62 = (1-0.38)$. The error-control information sent back by B to A and assumed to be intercepted by E is therefore not sufficient for E to correct the errors. A and B can hence compute some linear combinations of the bits stored by B and also known to A with high probability in order to generate a secure cipher key about which E only can have an arbitrarily little amount of information in Shannon's sense (see R. G. Gallager, quoted above).

Specifically, a situation is considered in which each of two parties initially possesses a stored string of digits from some alphabet. The strings have some similarity, i.e., the mutual information between the two strings is positive (see R. G. Gallager, quoted above, for a definition of mutual information). For instance, these strings are binary, and corresponding bits have a given probability to agree in their values. An eavesdropper is assumed to possess a third string of digits whose mutual information with each of the parties' strings may be positive.

In such a case, the invention provides cryptographic protocols which allow the two parties to generate a mutual secure random cipher key such that, at the end of the protocol, the amount of information which the eavesdropper has about this secret key is arbitrarily small. Subsequently, the parties may use such a secure cipher key to encipher and decipher messages either by using the unconditionally secure one-time pad mentioned above (see G. S. Vernam, quoted above) or by using a conventional cryptographic system incorporating a secret key. When the protocol is performed, communication between the parties is established by means of a communication channel which is error-free, i.e. sufficiently well protected by error-correcting codes, and assumed to be perfectly accessible for the eavesdropper. The total information possessed by the eavesdropper at the end of the protocol thus consists of the string given initially and the messages exchanged between the parties when the protocol is performed. Because the eavesdropper has virtually no information about the secret key shared by the parties, unconditional security can be achieved.

Diffie and Hellman (see US-A-4200770) have proposed another system which also allows two parties to generate a mutual cipher key by exchanging messages over a completely insecure channel. However, the security of this system is based on the infeasibility of solving a certain problem in number theory, which infeasibility is unproven. Hence, the security of the Diffie and Hellman system can be at most conditional rather than unconditional.

DESCRIPTION OF THE DRAWING

The invention will now be described in closer detail in the following, with reference to the accompanying drawing in which the single FIGURE is a block diagram of a cryptographic system according to the invention in a particular and exemplary embodiment thereof.

The FIGURE shows a cryptographic system having two cryptography stations A and B.

In this cryptographic system, a procedure known as "maximum-likelihood decoding" is used, which is defined in the following.

In the theory and practice of communications, a problem which often occurs is that of making an optimal reliability decision about a transmitted signal $\hat{U}$ based on the information $\hat{V}$ that was received (incidentally, this received information may consist of several parts of information which may have been received from different sources).

Accordingly, $\hat{U}$ and $\hat{V}$ denote random variables which can take on respective specific values $U_1, U_2, \ldots, U_i, \ldots$ and $V_1, V_2, \ldots, V_i, \ldots$ with respective probabilities $P(\hat{U}=U_1), P(\hat{U}=U_2), \ldots, P(\hat{U}=U_i), \ldots$ and $P(\hat{V}=V_1), P(\hat{V}=V_2), \ldots, P(\hat{V}=V_j), \ldots$ More particularly, the pair of random variables $(\hat{U},\hat{V})$ takes on the value $(U_i, V_j)$ with a probability $P(\hat{V}=V_j, \hat{U}=U_i)$.

Loosely speaking, the resulting decoding problem is solved by selecting, from the set of possible transmitted signals $\{U_1, U_2, \ldots\}$, that particular value $U_i$ of the list of values $U_1, U_2, \ldots$ which is most consistent with the particular received information $\hat{V}$. More precisely, the decoding problem is solved by minimizing the probability of making a wrong decision. Still more precisely, that particular value $U_i$ is selected for which the conditional probability is maximized that the transmitted signal $\hat{U}$ is equal to the particular value $U_i$, given that the received information is equal to the particular received value $V_j$ of the list of values $V_1, V_2, \ldots$ This probability, denoted $P(\hat{U}=U_i | \hat{V}=V_j)$, is a function which assigns a number to every pair $(U_i, V_j)$ of values for the random variables $\hat{U}$ and . Generally, for different values of $U_i$ and $V_j$ this number is different. When all possible transmitted signals have the same probability of being selected, it can be shown that the above decoding rule is equivalent to selecting the value $U_i$ which maximizes the conditional probability $P( =V_j|\hat{U}=U_i)$. This decoding strategy is known as "maximum-likelihood decoding" (for a more detailed explanation of maximum-likelihood decoding and other decoding strategies, see S. Lin and D. J. Costello, "Error Control Coding: Fundamentals and Application", Englewood Cliffs, N.J.:Prentice Hall Inc., 1983).

In the cryptographic system shown in the FIGURE, stations A and B each have stored therein, in a respective storage means STA and STB, a respective string $S_A$ and $S_B$ of digits selected from a finite alphabet, the strings $S_A$ and $S_B$ being statistically dependent on each other in a predetermined manner. The strings $S_A$ and $S_B$ may for instance have been received from some source and then stored in the respective storage means STA and STB.

By way of example, the two strings $S_A$ and $S_B$ could be binary and known to agree in a certain fraction (e.g. 80%) of their bits. Such a situation would arise when a random string is transmitted from station A to station B (or from station B station A) over a noisy channel with an error probability of 20%.

Station A generates an error-control information string C from string $S_A$ by means of an encoder ENC. In the particular embodiment described, the error-control information string C consists of a sequence of parity check bits for the bits of $S_A$, where each parity check bit is the sum modulo 2 of subsets of the bits of $S_A$. This corresponds to the use in the encoder ENC of a systematic linear block code (see R. E. Blahut, "Theory and practice of error control codes", Reading, MA:AddisonWesley, 1984) so that the error-control information string C only consists of that part of the code word which is not equal to $S_A$, i.e. string C consists only of the parity check bits rather than the entire code word. String C is then transmitted by means of a transmitter TRA of station A to a receiver REB of station B's over an error-free public channel CH1.

Station B has a decoder DEC for the chosen error-correcting code, which decoder DEC uses as inputs strings the particular stored string $S_B$ and the particular error-control information string C to generate that particular string D which maximizes the conditional probability $P(\hat{S}_A = D | \hat{S}_B = S_B, \hat{C} = C)$ that a random variable $\hat{S}_A$ corresponding to string $\hat{S}_A$ is equal to string D, given the conditions that a random variable $\hat{S}_B$ corresponding to string $S_B$ is equal to that latter string $S_B$ and a random variable $\hat{C}$ corresponding to said error-control information string C is equal to that latter string C. In this context, it should be understood that $\hat{S}_A$, $\hat{S}_B$, and $\hat{S}_B$ and $\hat{C}$ denote random variables which can in principle take on different values, and that $S_A$, $S_B$ and C denote particular values which are taken on by these random variables in the considered case.

When all possible strings $S_A$ have the same probability, i.e., when the string $S_A$ is a completely random string, then it is equivalent to select string D according to the "maximum-likelihood decoding" rule, i.e. so as to maximize the conditional probability $P(\hat{S}_B = S_B, \hat{C} = C | \hat{S}_A = D)$ that a random variable $\hat{S}_B$ corresponding to string $S_B$ is equal to that latter string $S_B$ and a random variable corresponding to said error-control information string C is equal to that latter string C, given the condition that a random variable $\hat{S}_A$ corresponding to string $S_A$ is equal to string D. In this case, as it appears that for all strings D which are not consistent with string C the conditional probability $P(\hat{S}_B = S_B, \hat{C} = C | \hat{S}_A = D)$ is zero, it is equivalent to the "maximum-likelihood decoding" rule to select string D, among all strings whose encoded error-control information is equal to string C, as that particular string which maximizes $P(\hat{S}_B = S_B | \hat{S}_A = D)$. For short, string D is station B's best possible guess about which string $S_A$ is stored in station A.

It should be noted that the conditional probabilities for different values of string D need not necessarily be computed in order to find the best string D. In many applications, a simple decoding procedure will guarantee that the resulting string D maximizes the conditional probability $P(\hat{S}_A = D | \hat{S}_B = S_B, \hat{C} = C)$.

In station B, a reliability estimator RES whose input consists of strings C, D and $S_B$ is used to estimate the reliability, of the decision, i.e., the conditional probability $P(\hat{S}_A = D | \hat{S} = S_B, \hat{C} = C)$ that the guess $D = \hat{S}_A$ is correct, given that $\hat{S}_B = S_B$ and $\hat{C} = C$. The reliability estimator RES outputs a decision bit F such that $F = 1$ if and only if the estimated reliability is sufficient, i.e. if the conditional probability is greater than a predetermined threshold, else $F = 0$.

The value of bit F is then transmitted by means of a transmitter TRB of station B to a receiver REA of station A over an error-free public channel CH2. It should be noted that in many cases a "maximum-likelihood decoder" can be implemented which need not compute any probabilities explicitly, and which directly outputs the decision bit F. In this case, the decoder DEC and the reliability estimator RES can be merged into a single device which could then be represented in a block diagram as one block that takes as inputs C and $S_B$ and generates as outputs D and F.

It should also be noted that in many applications the above mentioned probabilities are known only approximately, in which case the decoding and the reliability decision are based on these approximations of the probabilities rather than the actual probabilities. In other words, a system is usually implemented for fixed assumed approximations of the probabilities, and is independent of the actual probabilities, which may also change during the time period in which the system is used.

When the output of reliability estimator RES is $F = 1$, a string compressor SCB of station B is used to generate from input D a string $G_B$ which is shorter than D. String $G_B$ may consist of some linear combinations of the digits of D. Station A uses an identical string compressor SCA with input $S_A$ to obtain a string $G_A$. While the probability that $G_A = G_B$ is at least as great as the probability that $D = S_A$, the object of this compression is to reduce the eavesdropper's information about the respective string $G_A$ or $G_B$ when compared to his respective information about $S_A$ or $S_B$. The respective strings $G_A$ and $G_B$ are stored in the storage means STA and STB of the respective stations A and B.

It should be noted that instead of performing an estimation of station A's string $S_A$ and a string compression on this estimated string D, station B can alternatively estimate directly the compressed string $G_A$. In this case, station B's guess about station A's compressed string $G_A$ is that string D which maximizes the conditional probability $P(\hat{G}_A = D | \hat{S}_B = S_B, \hat{C} = C)$ that a random variable $\hat{G}_A$ corresponding to the compressed string $G_A$ is equal to the particular string D, given the condition that a random variable $\hat{S}_B$ corresponding to string $S_B$ is equal to that latter string $S_B$ and a random variable $\hat{C}$ corresponding to the error-control information string C is equal to that latter string C.

The above described protocol is repeated several times for independent stored strings $S_A$ and $S_B$, and in both stations A and B there are selected, compressed and stored those respective strings $G_A$ and $G_B$ for which the reliability estimator RES of station B has decided that they are sufficiently reliable.

Instead of repeatedly performing the protocol as described above, the error-control information for the independent strings also may be transmitted by station A all at once, and the reliability decisions then are also transmitted back from station B to station A in one message. In this case, station A groups the string $S_A$ into a plurality of subblocks, transmits error-control information for every subblock, and station B makes an individual reliability decision about every subblock. At the end of this protocol, stations A and B both possess a string consisting in the concatenation of the compressed selected subblocks.

Depending on the reliability threshold used in the reliability estimator RES, the two strings $G_A$ and $G_B$ stored in the respective stations A and B may be identical with a high probability, or they may still differ with a certain non-negligible digit error probability. In the latter case, stations A and B repeat the same protocol, where $S_A$ and $S_B$ are replaced by the new respective strings $G_A$ and $G_B$, and where a different error-correcting code may be used if desired.

The protocol is repeated a number of times sufficient to ensure that the two strings $G_A$ and $G_B$ stored in stations A and B agree with an overwhelmingly high probability.

The purpose of the protocol described above is to send error-control information and compress the strings stored in stations A and B in such a manner that the reliability of the compressed strings $G_a$ and $G_B$ is increased. Clearly, the reliability of an eavesdropper's string may increase as well, but only to a smaller extent. To attain the desired result that the eavesdropper should possess only arbitrarily little information, it may be necessary for stations A and B at some stages of the protocol to only compress the stored strings without sending error-control information, in order to decrease the reliability of the eavesdropper's stored string. Clearly, such a compression step also decreases the reliability of the respective compressed strings $G_A$ and $G_B$ stored in stations A and B, but in general only to a smaller extent. By means of successive applications of reliability increasing and decreasing steps, stations A and B will end up with respective strings $G_A$ and $G_B$ which agree with high probability, whereas the eavesdropper's information virtually is statistically independent of this random string shared by stations A and B.

As has been said above, a possible method for providing received strings which are correlated, i.e. statistically dependent on each other, is to use the signal transmitted by a satellite. This signal is corrupted by noise when received on the earth, and the noise for three different receivers at three different locations is different.

By way of example, a situation is considered in which a satellite broadcasts random bits, and stations A and B as well as an eavesdropper E receive the random bits with a respective error probability of 20%, 20% and 15%, where the errors are independent of each other. It may be noted that in this example E actually receives the bits more reliably than both A and B. Nevertheless, A and B can generate an unconditionally secure random cipher key as described in the following.

Each station A and B groups the received random strings (whose bits disagree with a bit error probability $1-0.8\cdot0.8-0.2\cdot0.2=0.32$) into blocks of 5 bits. For every received block $S_A = [s_1, s_2, s_3, s_4, s_5]$, station A transmits to station B over the error-free public channel the error-control information string $C = [s_1+s_2, s_1+s_3, s_1+s_4, s_1+s_5]$ consisting of 4 parity check bits. As mentioned above, addition of binary digits is defined as addition modulo 2. Station B accepts a block as sufficiently reliable if and only if the 4 parity check bits received from station A agree with the corresponding parity check bits of string $C' = [t_1+t_2, t_1+t_3, t_1+t_4, t_1+t_5]$ for the block $S_B = [t_1, t_2, t_3, t_4, t_5]$ of station B. In other words, the decoder and reliability estimator are implemented together as a parity checker for $S_B$ and a comparator for these computed parity check bits $C'$ and received parity check bits $C$. Thus, the decision bit F is assigned the value 1 when the error-control information string $C$ received in station B is equal to the auxiliary error-control information string $C'$ computed in station B for string $S_B$ in the same manner as the error-control information string $C$ has been computed in station B for string $S_A$. When a block is accepted, stations A and B both store as the compressed string the single bit which is the sum of the five bits, i.e., string $G_A = s_1+s_2+s_3+s_4+s_5$ is stored in station A and string $G_B = t_1+t_2+t_3+t_4+t_5$ is stored in station B.

The parity check bits agree if and only if the blocks $S_A$ and $S_B$ are either equal, which occurs with a probability $(0.68)^5 = 0.1454$, or if they disagree in every single bit, which occurs with probability $(0.32)^5 = 0.00336$. The probability that a block is accepted is thus equal to $0.1454 + 0.00336 = 0.1487$ and the probability that the bits $G_A$ and $G_B$ disagree for an accepted block is equal to $0.00336/0.1487 = 0.0225$ (i.e. 2.25%). The eavesdropper's decision about the transmitted bit is wrong when 3 or more errors are contained in his received block of 5 bits. In a similar but more tedious manner it may be shown that the eavesdropper's optimal guess about the bit $G_A$ is bound to be wrong with a probability of at least 6.15%. At the end of this first round of the protocol, stations A and B each possess a random string whose expected length is $0.1487/5 = 0.0297$ times the length of the originally received random string and whose bits agree with a probability of 97.75%.

More precisely, the bits resulting from this reliability increasing protocol appear to stations A and B and to the eavesdropper E as if they had been received from a random bit source over three independent channels having respective bit error probabilities of 1.141%, 1.141% and 5.125%. Incidentally, the cascade of two channels having respective bit error probabilities of 1.141% and 5.125% is equivalent to a single channel having a bit error probability of 6.15%, which is exactly the eavesdropper's bit error probability indicated above.

By now compressing the stored string further by adding 8 bits at a time to form a new shared bit, the reliabilities of the bits of the new string are reduced. These bits appear to stations A and B and to the eavesdropper E as if they had been received from a random bit source over three independent channels having respective bit error probabilities of $1-(1-0.01141)^8 = 0.0843 = 8.43\%$, 8.43% and $1-(1-0.05125)^8 = 0.2895 = 28.95\%$.

Stations A and B can now perform again the same reliability increasing protocol as described above, namely, station A can send to station B 4 parity check bits for every block of 5 shared bits resulting from the previously performed protocol, and stations A and B can store the sum of the 5 bits of each block. This results in bits which appear to stations A and B and to the eavesdropper E as if they had been received from a random bit source over three independent channels having respective bit error probabilities of 0.01%, 0.01% and 15.4 By now adding 10 of these bits at a time, stations A and B end up with resulting new bits which agree with a probability of 99.8%, whereas the eavesdropper E's computed bits disagree with a probability of 48.74%. Such an error probability corresponds to the eavesdropper E having only 0.00046 bits of information (see R. G. Gallager, quoted above) rather than the entire 1 bit of information about every bit shared by stations A and B. This eavesdropper's amount of information is negligible.

If desirable, the eavesdropper's information about the final string shared by A and B could be even further reduced to an arbitrarily small amount by further compressing this shared string. It should be noted that in order to compute the amount of the eavesdropper's information, one must take into account that the eavesdropper need not necessarily make an optimal decision about the bits shared by A and B at each step of the protocol, as has been assumed in the analysis given in the above example, he can rather base his final decision on all the information he received during the entire performing of the protocol. Such an analysis of the described protocol for a given sequence of protocol steps is complicated but feasible. However, for performing the protocol it is not required to analyze it in such manner.

Thus, the present invention allows stations A and B to perform a protocol at the end of which they each possess the same shared random string. This protocol is such that an eavesdropper, even being given access to all messages exchanged between A and B and having unrestricted computing power, still cannot determine the string shared by A and B, or even such that the eavesdropper gets only arbitrarily little information in Shannon's sense (see R. G. Gallager, quoted above) about said shared string.

In a particular embodiment of the invention, when the protocol performed by stations A and B is repeated, i.e. performed a predetermined number of times in succession, stations A and B may exchange their respective roles with each other one or several times.

In another particular embodiment of the invention, the encoder may use as a second input the output string R of a random generator RAN, the connections of which are shown in the FIGURE in dashed lines. In this case, the string D is an estimate not only of string $S_A$ but of a concatenated string, denoted $S_A \# R$, resulting from the concatenation of strings $S_A$ and R and stored in station A. Accordingly, in station B the decoder DEC selects that string D which maximizes the conditional probability $P(\hat{S}_A \# \hat{R} = D | \hat{S}_B = S_B, \hat{C} = C)$, wherein $\hat{R}$ denotes a random variable corresponding to the actual string R output by the random generator RAN in station A, and $P(\hat{S}_A \# \hat{R} = D | \hat{S}_B = S_B, \hat{C} = C)$ is the conditional probability that a random variable $\hat{S}_A \# \hat{R}$ corresponding to the concatenated string $S_A \# R$ is equal to the particular string D, given the conditions that a random variable $\hat{S}_B$ corresponding to string $S_B$ is equal to that latter string $S_B$ and a random variable $\hat{C}$ corresponding to the error-control information string C is equal to that latter string C.

It leads to an equivalent result to select string D, among all decoded strings whose encoded error-control information is equal to the actual error-control information C, as that string which maximizes the conditional probability $P(\hat{S}_A \# \hat{R} = D | \hat{S}_B = S_B)$.

One example of using randomization is to choose a random string R, encode it into a code word of the same length as $S_A$ and then transmit the bit by bit sum modulo 2 of $S_A$ and the code word over the public channel. A receiver can recover the random string R if and only if the fraction of errors in its version of the string $S_A$ is sufficiently small to be corrected by a decoder for the code. Accordingly, in station B the decoder selects that string D which maximizes the conditional probability $P(\hat{R} = D | \hat{S}_B = S_B, \hat{C} = C)$ that a random variable $\hat{R}$ corresponding to the random string R is equal to the particular string D, given the condition that a random variable $\hat{S}_B$ corresponding to string $S_B$ is equal to that latter string $S_B$ and a random variable corresponding to the error-control information string $\hat{C}$ is equal to that latter string C. In this case the compression transformation is applied by station A to string R and by station B to string D.

Several generalizations of the described embodiment may be contemplated.

Other codes than the ones described can be used, including any systematic or non-systematic linear block codes such as Hamming codes, Golay codes, Reed-Solomon codes, Bose-Chaudhuri-Hocquenghem codes, Reed-Muller codes, Goppa codes, etc., or convolutional codes. Nonsystematic codes make sense when a random generator string R is used in the encoding process. A description of these codes and of procedures for decoding them is given by R. E. Blahut (quoted above) or in available textbooks on error-correcting codes. The techniques of using error-correcting codes is state of the art.

As mentioned above, the decoder DEC and reliability estimator RES can be merged into one device (which could be represented by one block of the block diagram and realized as one functional sub-station), since many decoding procedures can be adapted to also provide reliability information. The reliability estimator RES may also be eliminated in case every decoded block should be accepted. Clearly also, in case the decision bit F always has the value 1 it would not be necessary to transmit it from station B to station A.

If the amount of information which the eavesdropper has about the random secret cipher key shared by stations and B is still too high, stations A and B can further reduce the eavesdropper's information using a protocol due to Bennett, Brassard and Robert (see C. H. Bennett, G. Brassard and J.-M. Robert, quoted above) based on universal hashing, thereby further reducing the length of the shared key.

When station A is connected to a noisy broadcast channel to transmit information to station B, the transmitted string need not necessarily be random. Instead, an error-correcting code may be used in station A to encode randomly selected information blocks and then the corresponding code words are transmitted. In station B, reliability decisions can then be made directly on the decoded blocks, which are transmitted back to station A in the described way.

Similarly, the string broadcast by a transmitter (e.g. in a satellite) could be a random string encoded with some error-correcting code. In both stations A and B individual reliability decisions can then be made in a first step and the public channel be used in this first step only to reach agreement on positions of blocks which both have been received with sufficiently reliability.

Also, the compression performed by stations A and B may be publicly agreed by stations A and B over the public channel before or after the error-control information string has been transmitted, rather than being performed according to predetermined and fixed rules. For instance, only after the error-control information string has been transmitted, stations A and B will decide (e.g. station A will decide and inform station B over the public channel) which parity check bits must be computed and used.

It will be understood that the above described embodiments are but examples from which it is possible to deviate without departing from the scope of the invention as defined in the appended claims.

I claim:

1. A method of generating a cipher key based on information difference in a cryptographic system comprised of at least a first and a second cryptography stations, said method comprising the steps of
    storing, in said first and second stations (A,B), a respective string ($S_A, S_B$) of digits selected from a finite alphabet,
    in said first station (A), generating an error-control information string (C) from the respective string ($S_A$) stored in said first station (A),
    transmitting said error-control information string (C) from said first station (A) to said second station (B) over an error-free public channel CH1,
    in said second station (B), generating a particular string (D) and a decision bit (F) representative of a reliability estimate, said particular string (D) being that string which maximizes a predetermined reliability function of a string combination ($S_B$,C,D) consisting of said string ($S_B$) stored in said second station (B), said error-control information string (C) and said particular string (D), and said decision bit (F) being assigned the value 1 if and only if, when said predetermined reliability function is maximized as said above, a maximum value taken on by said predetermined reliability function is greater than a predetermined threshold, said decision bit (F) else being assigned the value 0,
    transmitting said value of said decision bit (F) from said second station (B) to said first station (A) over an error-free public channel CH2,
    in said first and second stations (A,B), tagging as accepted said respective strings ($S_A, S_B$) stored in said first and second stations (A,B) when said decision bit (F) has the value 1,
    performing the above sequence of steps a predetermined number of times to result in a corresponding plurality of tagged strings, and
    at said first and second stations (A,B), concatenating said tagged strings ($S_A, S_B$) to result in a random cipher key shared by said first and second stations (A,B).

2. The method of claim 1, in which said predetermined reliability function is defined as a conditional probability $P(\hat{S}_A = D | \hat{S}_B = S_B, \hat{C} = C)$ that a random variable ($\hat{S}_A$) corresponding to said string ($\hat{S}_A$) stored in said first station (A) is equal to said particular string (D), given the conditions that a random variable ($\hat{S}_B$) corresponding to said string ($S_B$) stored in said second station (B) is equal to that latter string ($S_B$) and a random variable ($\hat{C}$) corresponding to said error-control information string (C) is equal to that latter string (C).

3. The method of claim 1, in which, in said first station (A), a random string (R) is generated and then a concatenation is performed on said string ($S_A$) stored in said first station (A) and said random string (R) to result in a concatenated string ($S_A\#R$) which is substituted for said string ($S_A$) stored in said first station (A) when said error-control information string (C) is generated, so that said error-control information string (C) is generated from said concatenated string ($S_A\#R$).

4. The method of claim 3, in which said predetermined reliability function is defined as a conditional probability $P(\hat{S}_A\#\hat{R} = D | \hat{S}_B = S_B, \hat{C} = C)$ that a random variable ($\hat{S}_A\#\hat{R}$) corresponding to said concatenated string ($S_A\#R$) stored in said first station (A) is equal to said particular string (D), given the conditions that a random variable ($\hat{S}_B$) corresponding to said string ($S_B$) stored in said second station (B) is equal to that latter string ($S_B$) and a random variable ($\hat{C}$) corresponding to said error-control information string (C) is equal to that latter string (C), and said decision bit (F) is assigned the value 1 if and only if said conditional probability $P(\hat{S}_A\#\hat{R} = D | \hat{S}_B = S_B, \hat{C} = C)$ is greater than a predetermined threshold.

5. The method of claim 4, in which said error-control information string (C) is generated by first encoding said random string (R) to result in an encoded string and then adding digit by digit said encoded string and said string ($S_A$) stored in said first station (A), and said predetermined reliability function is defined as a conditional probability $P(\hat{R} = D | \hat{S}_B = S_B, \hat{C} = C)$ that a random variable ($\hat{R}$) corresponding to said random string (R) is equal to said particular string (D), given the condition that a random variable ($\hat{S}_B$) corresponding to said string ($S_B$) stored in said second station (B) is equal to that latter string ($S_B$) and a random variable ($\hat{C}$) corresponding to said error-control information string (C) is equal to that latter string (C).

6. The method of claim 1, in which, when said decision bit (F) has the value 1, a string compression is performed in said first station (A) on said string ($S_A$) stored therein to result in a first compressed string ($G_A$) which is then stored in said first station (A).

7. The method of claim 6, in which the sequence of steps is repeated at least once, and in said repeated sequence said predetermined reliability function is defined as a conditional probability $P(\hat{G}_A = D | \hat{S}_B = S_B, \hat{C} = C)$ that a random variable ($\hat{G}_A$) corresponding to said first compressed string ($G_A$) is equal to said particular string (D), given the condition that a random variable ($\hat{S}_B$) corresponding to said string ($S_B$) stored in said second station (B) is equal to that latter string ($S_B$) and a random variable ($\hat{C}$) corresponding to said error-control information string (C) is equal to that latter string (C).

8. The method of claim 6, in which, when said decision bit (F) has the value 1, a string compression also is performed in said second station (B) on said particular string (D) to result in a second compressed string ($G_B$) which is then stored in said second station (B).

9. The method of claim 8, in which identical string compressions are performed in said first station (A) on said string ($S_A$) stored therein to result in a first compressed string ($G_A$) which is then stored in said first station (A) and in said second station (B) on said particular string (D) to result in a second compressed string ($G_B$) which is then stored in said second station (B).

10. The method of claim 5, in which, when said decision bit (F) has the value 1, identical string compressions are performed in said first station (A) on random string (R) to result in a first compressed string ($G_A$) which is then stored in said first station (A) and in said second station (B) on said particular string (D) to result in a second compressed string ($G_B$) which is then stored in said second station (B).

11. The method of claim 6, in which compression of a string of digits is defined as generating a compressed string consisting of digits, each of which is a linear combination of digits of said string subjected to compression.

12. The method of claim 1, in which said error-control information string (C) is generated as a string consisting of digits, each of which is a linear combination of digits of said string ($S_A$) stored in said first station (A).

13. The method of claim 1, in which all strings are binary strings.

14. The method of claim 11, in which all strings are binary strings consisting of a set of bits, and said linear combination of digits is defined as a sum modulo 2 of the bits comprised in a subset of said set of bits.

15. The method of claim 14, in which both said strings ($S_A,S_B$) respectively stored in said first and second stations (A,B) have a predetermined number N of bits, said error-control information string (C) consists of a number N-1 of parity check bits, and compression of a string is defined as replacing the latter string by a single bit which results from said linear combination being applied to all bits of the latter string.

16. The method of claim 15, in which said decision bit (F) is assigned the value 1 when said error-control information string (C) received in said second station (B) is equal to an auxiliary error-control information string (C') computed in said second station (B) for said string ($S_B$) stored in said second station (B) in the same manner as said error-control information string (C) is computed in said first station (A) for said string ($S_A$) stored in said first station (A).

17. The method of claim 1, in which the sequence of steps is performed a predetermined number of times in succession.

18. The method of claim 17, in which each of said strings ($S_A,S_B$) respectively stored in said first and second stations (A,B) is a result of a previously performed sequence of steps.

19. The method of claim 18, in which each of said strings ($S_A,S_B$) respectively stored in said first and second stations (A,B) is a result ($G_A,G_B$) of a previously performed sequence of steps including a string compression performed in said first station (A) on said string ($S_A$ or R) stored therein to result in a first compressed string ($G_A$) which is then stored in said first station (A) and in said second station (B) on said particular string (D) to result in a second compressed string ($G_B$) which is then stored in said second station (B).

20. The method of claim 17, in which said first and second stations (A,B) exchange their respective roles when the sequence of steps is repeated.

21. The method of claim 1, in which the sequence of steps is simultaneously performed a predetermined number of times in parallel, resulting in a same predetermined number of resulting error-control information strings (C) and resulting values of said decision bit (F), all said resulting error-control information strings (C) being merged to be transmitted from said first station (A) to said second station (B) in one message, and all said resulting values of said decision bit (F) being merged to be transmitted from said second station (B) to said first station (A) in one message.

22. A cryptographic system comprising a first and a second cryptography station (A,B), each station (A,B) comprising a respective transmitter (TRA,TRB) and a respective receiver (REA,REB) capable of mutually transferring information strings over respective error-free public channels (CH1,CH2), and a storage means (STA,STB) for storing respective strings of digits ($S_A,S_A,G_A,G_B$), the first station (A) further comprising a string compressor (SCA) having inputs respectively connected to an output of the respective storage means (STA) and to an output of the respective receiver (REA), and having an output connected to an input of the respective storage means (STA), and an encoder (ENC) having an input connected to said output of the respective storage means (STA) and an output connected to an input of the respective transmitter (TRA), and the second station (B) further comprising a decoder (DEC) having an input connected to an output of the respective receiver (REB) and to an output of the respective storage means (STB), a string compressor (SCB) having an input connected to an output of the decoder (DEC) and an output connected to an input of the respective storage means (STB), and a reliability estimator (RES) having inputs each respectively connected to said outputs of the decoder (DEC), the respective receiver (REB) and the respective storage means (STB), and having an output connected to a further input of the string compressor (SCB) and to an input of the respective transmitter (TRB).

23. A cryptographic system according to claim 22, in which said decoder (DEC) and said reliability estimator (RES) are merged into a single device.

24. A cryptographic system according to claim 22, in which the first station (A) further comprises a random generator (RAN) whose output is connected to a further input of the respective string compressor (SCA) and to a further input of the encoder (ENC).

* * * * *